United States Patent [19]
Jo et al.

[11] Patent Number: 5,559,375
[45] Date of Patent: Sep. 24, 1996

[54] POWER WINDOW CONTROL SYSTEM OF AN AUTOMOTIVE VEHICLE

[75] Inventors: Hyun M. Jo; Yong H. Kim, both of Seoul, Rep. of Korea

[73] Assignee: Samsung Electronics Co., Ltd., Suwon, Rep. of Korea

[21] Appl. No.: 304,213

[22] Filed: Sep. 15, 1994

[30] Foreign Application Priority Data

Sep. 15, 1993 [KR] Rep. of Korea ............... 93-18577

[51] Int. Cl.⁶ .................................................. H02P 1/22
[52] U.S. Cl. .......................... 307/10.1; 318/293; 318/471
[58] Field of Search .................................. 307/9, 1, 10.1; 318/264–266, 286, 466–469, 471, 434, 293; 180/270

[56] References Cited

U.S. PATENT DOCUMENTS

| | | | |
|---|---|---|---|
| 4,097,788 | 6/1978 | Nygaard et al. | 318/271 |
| 4,146,826 | 3/1979 | Wojslawowicz | 307/10.1 |
| 4,562,387 | 12/1985 | Lehnhoff | 318/286 |
| 4,725,765 | 2/1988 | Miller | 318/434 |
| 4,801,812 | 1/1989 | Brusasco | 318/466 |
| 4,836,323 | 6/1989 | Kataoka et al. | 180/270 |
| 4,924,158 | 5/1990 | Kelley et al. | 318/293 |
| 5,229,695 | 7/1993 | Tsuda et al. | 318/471 |

*Primary Examiner*—William M. Shoop, Jr.
*Assistant Examiner*—Richard T. Elms
*Attorney, Agent, or Firm*—Cushman Darby & Cushman, L.L.P.

[57] ABSTRACT

The present invention provides a power window control system of a vehicle for raising or lowering windows that is controlled by user operated switches which supply or cut off vehicle battery power to the motor that raises or opens the window. A combination of overcurrent protection circuitry and overheating protection circuitry is used to allow switches to be used that are less expensive than the conventionally used switches which can undesirably arc and, eventually malfunction, as previously described.

15 Claims, 8 Drawing Sheets

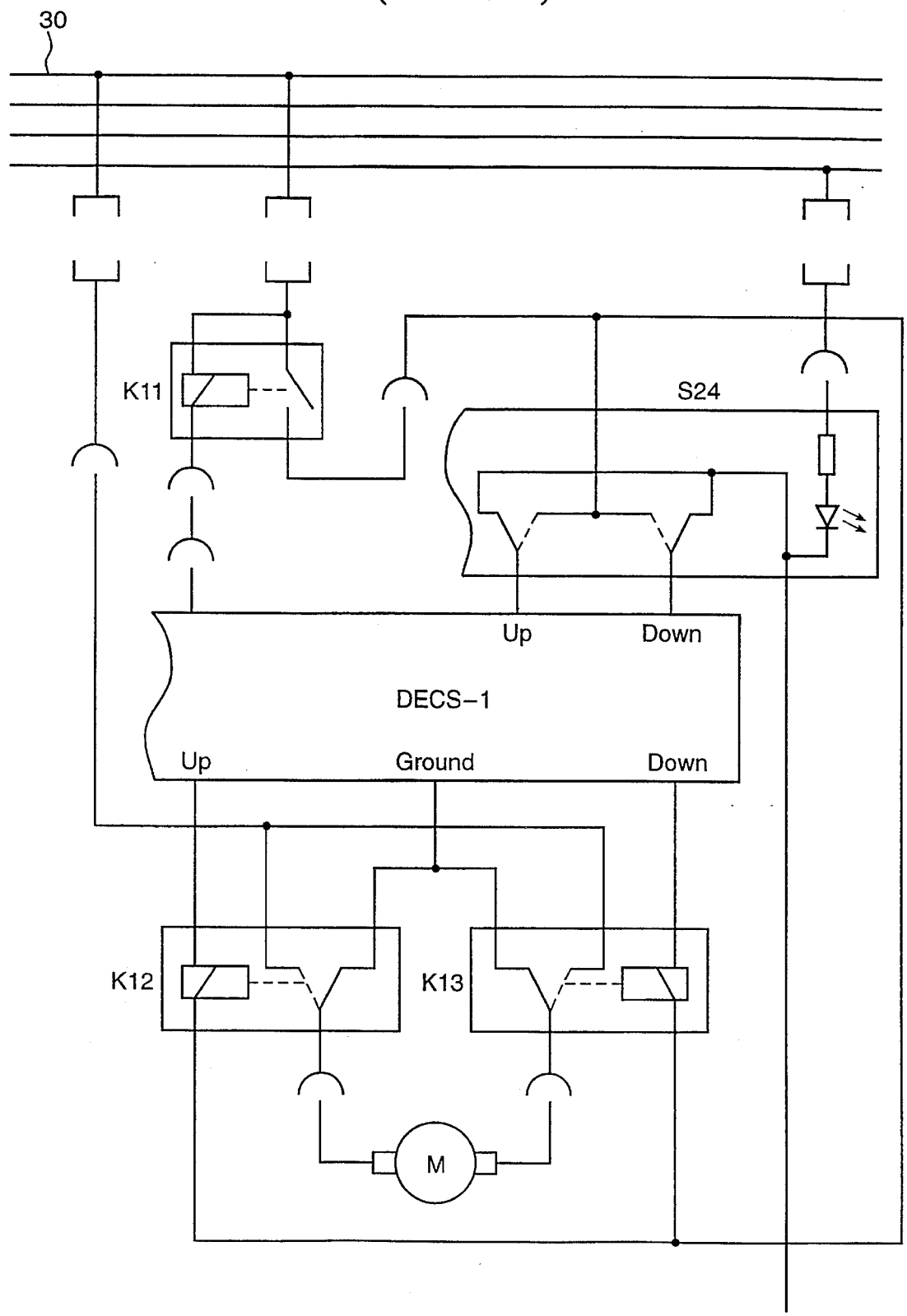

333# POWER WINDOW CONTROL SYSTEM OF AN AUTOMOTIVE VEHICLE

BACKGROUND OF THE INVENTION (1) Field of the Invention

The present invention relates to a power window control system of an automotive vehicle.

(2) Description of the Related Art

Prior to the development of power windows, vehicle window were raised using a manual cranking device. More recently, power windows have been developed that are controlled by a power window control system.

FIG. 11 illustrates a conventional power window control system which includes a plurality of relays, a mechanical switch and a power line. Through simple switching operations using the relays and mechanical switch, the window position in each of four doors/locations can be controlled. Further, all of these windows may all be controlled from the driver's seat.

In operation, a motor M of the power window system controls opening and closing of each window. However, overloading can occur. To avoid this, the illustrated conventional power window control system separates power line 30 from the motor M using an overheat regulator to inhibit operation of motor M.

The conventional power window control system includes a mechanical switch for initiating raising and lowering of the power window. The power line 30 is directly turned on or turned off by means of the relays K11 to K13.

However, in operation, the mechanical switches and K13 for each window oxidize from arcing that occurs therein, thus generating poor switching operations and undesirable surge voltages. Since current must flow through these mechanical switches for proper operation, an expensive and strong switch is required, as well as heavy and complicated wiring. This then necessitates the use of heavy wiring between the power supply and the mechanical switch, and the mechanical switch and the motor.

SUMMARY OF THE INVENTION

It is an object of the present invention to provide a power window control system which controls raising and lowering of windows using logic voltage level control signals.

It is a second object of the present invention to provide a power window control system that can sense imminent overloading and overheating of the motor prior to the occurrence of overloading or overheating.

It is a third object of the present invention to provide a power window control system which includes a one-touch window positioning technique that is adjustable by the user and a step window positioning technique.

It is a fourth object of the invention to allow the power window control system can be operated for a predetermined period of time after the vehicle has been turned off.

In order to achieve these objects, the present invention provides a power window control system of a vehicle for raising or lowering windows that is controlled by user operated switches which supply or cut off vehicle battery power to the motor that raises or opens the window. A combination of overcurrent protection circuitry and overheating protection circuitry is used to allow switches to be used that are less expensive than the conventionally used switches which can undesirably are and, eventually malfunction, as previously described.

BRIEF DESCRIPTION OF THE DRAWINGS

These and other advantages of the present invention may be appreciated from studying the following detailed description of the preferred embodiment together with the drawings in which:

FIG. 11 is a conventional power window circuit diagram.

DETAILED DESCRIPTION OF THE PREFERRED EMBODIMENTS

Figure 1:
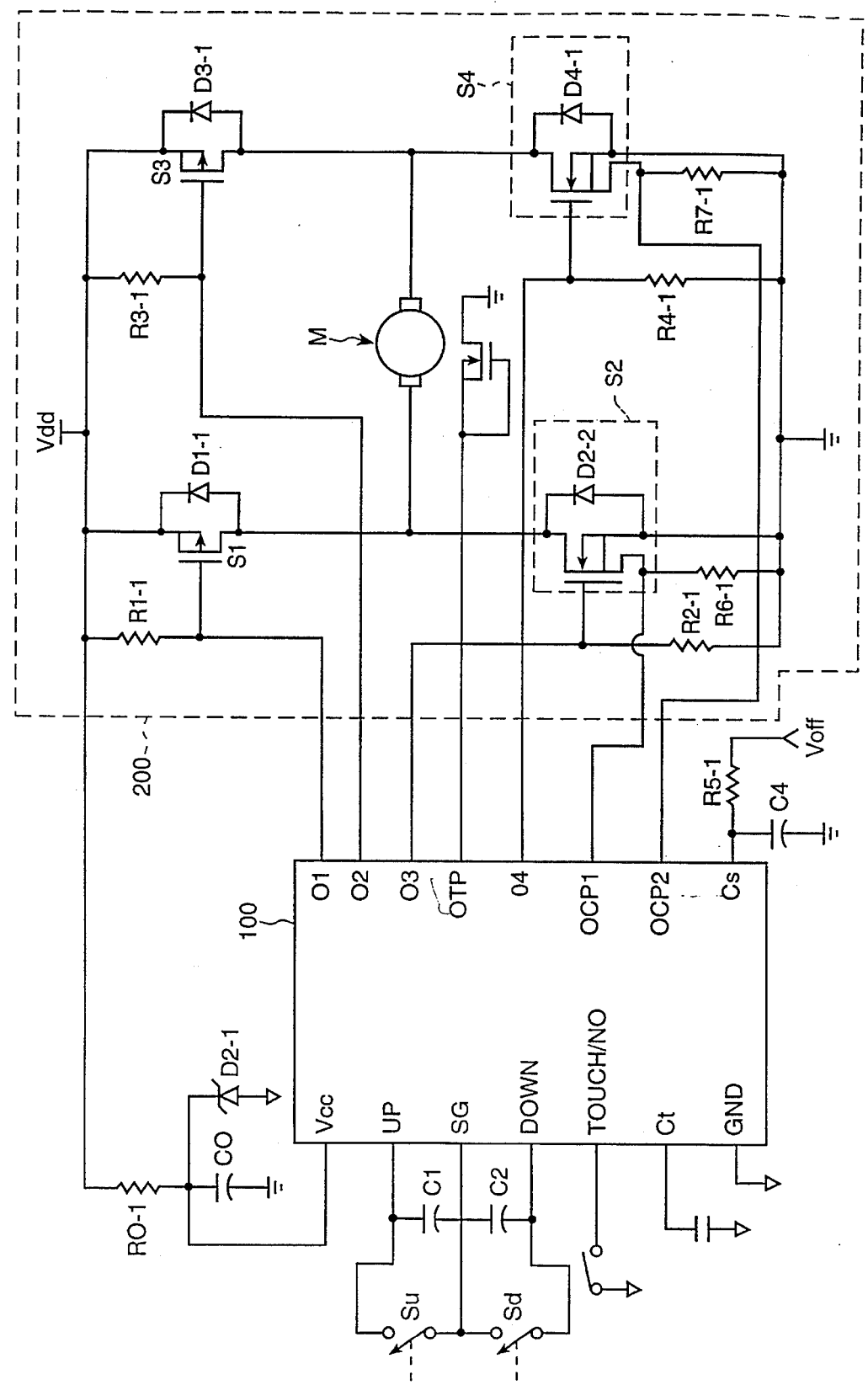
FIG. 1 illustrates a block diagram of a power window control system of an automotive vehicle according to the present invention.
Figure 2:
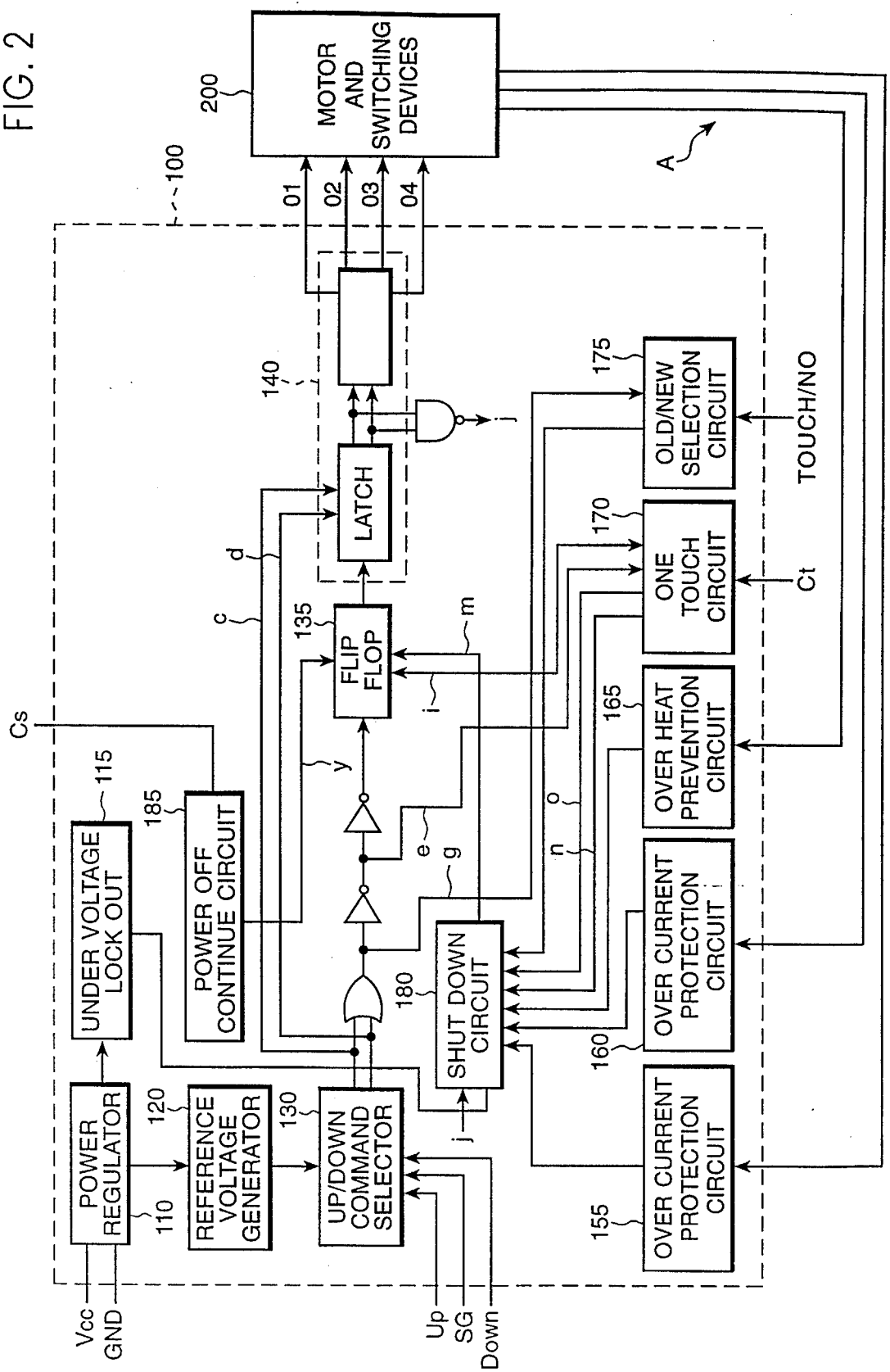
FIG. 2 is a block diagram illustrating in more detail the control circuit of FIG. 1.

FIG. 1 shows a power window control system including a control circuit 100, preferably implemented on a single semiconductor chip, a motor M mounted for causing displacement of a window, and four switching devices S1, S2, S3 and 84 for controlling the rotational direction of the motor M and for supplying the driving current. Switches Su and Sd are up/down switches turned on or off by a user. A more detailed block diagram of control circuit 100 is shown in FIG. 2.

As illustrated in FIG. 1, the control circuit 100 outputs up signal UP, down signal DOWN and ground signal SG. Control circuit 100 outputs four output signals 01, 02, 03 and 04. The four output signals 01 through 04 are TTL, CMOS level logic signals and each of them is connected to one of the gate terminals of the switching devices 81 through 84, with one of the resistances R1-1, R2-1, R3-1 and R4-1 used to bias each of the switches S1 through S4. If one of the switching devices is turned on by a gate signal, a battery voltage of 12 V is applied to the DC motor M. Motor M rotates in the appropriate direction when an up or down signal is applied thereto.

The exothermal condition of the switching devices 81 through 84 is monitored by resistances R6-1, R7-1, cause signals OCP1 and OCP2 to develop, respectively, and which signals also input into control circuit 100, which also responds to changes in exothermal conditions, as described hereinafter in more detail. The switching devices, particularly S2 and S4, are sense field effect transistors which provide an accurate fraction of the current being consumed by Motor M to OCP1 and OCP2. When overcurrent flows to the motor, resistors R6-1 and R7-1 help develop the signals input to control circuit 100. Diodes D1-1, D2-1, D3-1 and D4-1 are connected between the source and the drain of each of the corresponding switching devices S1 through S4.

A signal applied to resistor R5-1 connected to a terminal side Cs of the control circuit 100 and to the capacitor C4 through resistor R5 indicates to the control circuit 100 that the vehicle is turned off or turned on. The power control system according to the present invention still operates even after the vehicle has stopped running.

Referring now to FIG. 2, the control circuit 100 will be described in more detail. In FIG. 2, the motor and switching devices of FIG. 1 are expressed in block form by a motor and switching device block 200, which is also represented in FIG. 1. The Vdd 12 volt voltage used by the motor M is reduced to the Vcc voltage of, preferably, 5 V using the appropriate resistor R0 and smoothing capacitor C0 illustrated in FIG. 1.

Block 110 in the control circuit 100 is a power regulator supplied with a Vcc voltage through resistance R0 and a capacitor Co, as described previously with respect to FIG. 1 and stabilizes the logic-level voltage Vcc. This voltage is applied to a reference voltage generating circuit 120 and an under voltage lock out (UVLO) circuit 115, as well as other blocks requiring Vcc voltage to operate. A zener diode D2 illustrated in FIG. 3. protects the control circuit 100 when surge voltages occur due to various abnormal conditions in the vehicle.

Figure 3:
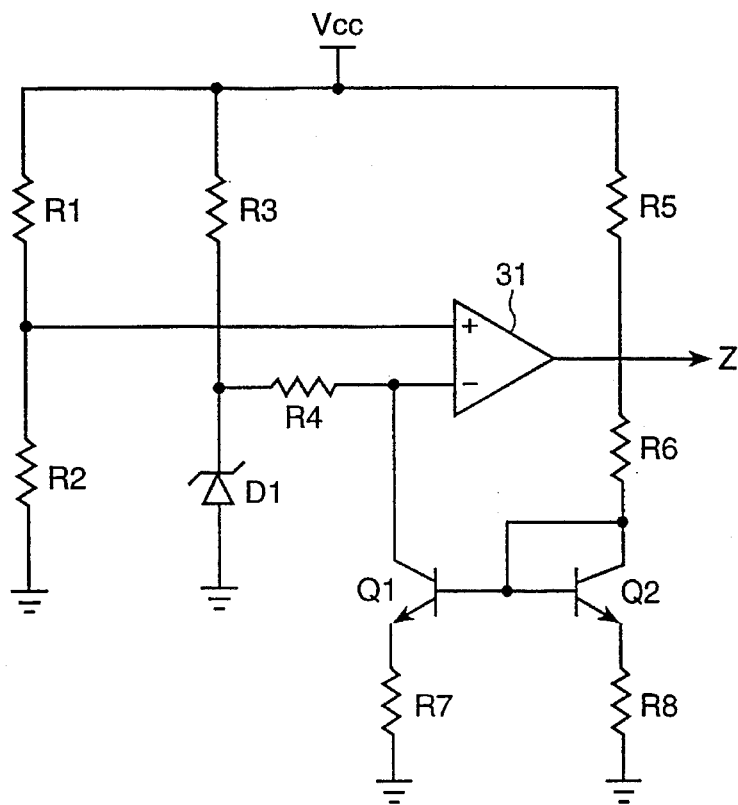
FIG. 3 is a detailed view of an under voltage lock out circuit 115 illustrated in FIG. 2.

The UVLO circuit 115 is depicted in FIG. 3 in detail. The Vcc voltage from power regulator 110 in FIG. 2 is sensed by the voltage divider of created by resistors R1 and R2, the sensed voltage is applied to the positive terminal of comparator 31. The negative terminal of comparator 31 inputs a constant voltage that results from the zener diode D1. A current mirror with transistors Q1 and Q2 is formed once the voltage on the positive terminal of the comparator exceeds that of the negative terminal, indicating that sufficient power is available. This condition is indicated by the signal Z being created at the output of comparator 31.

Figure 4:
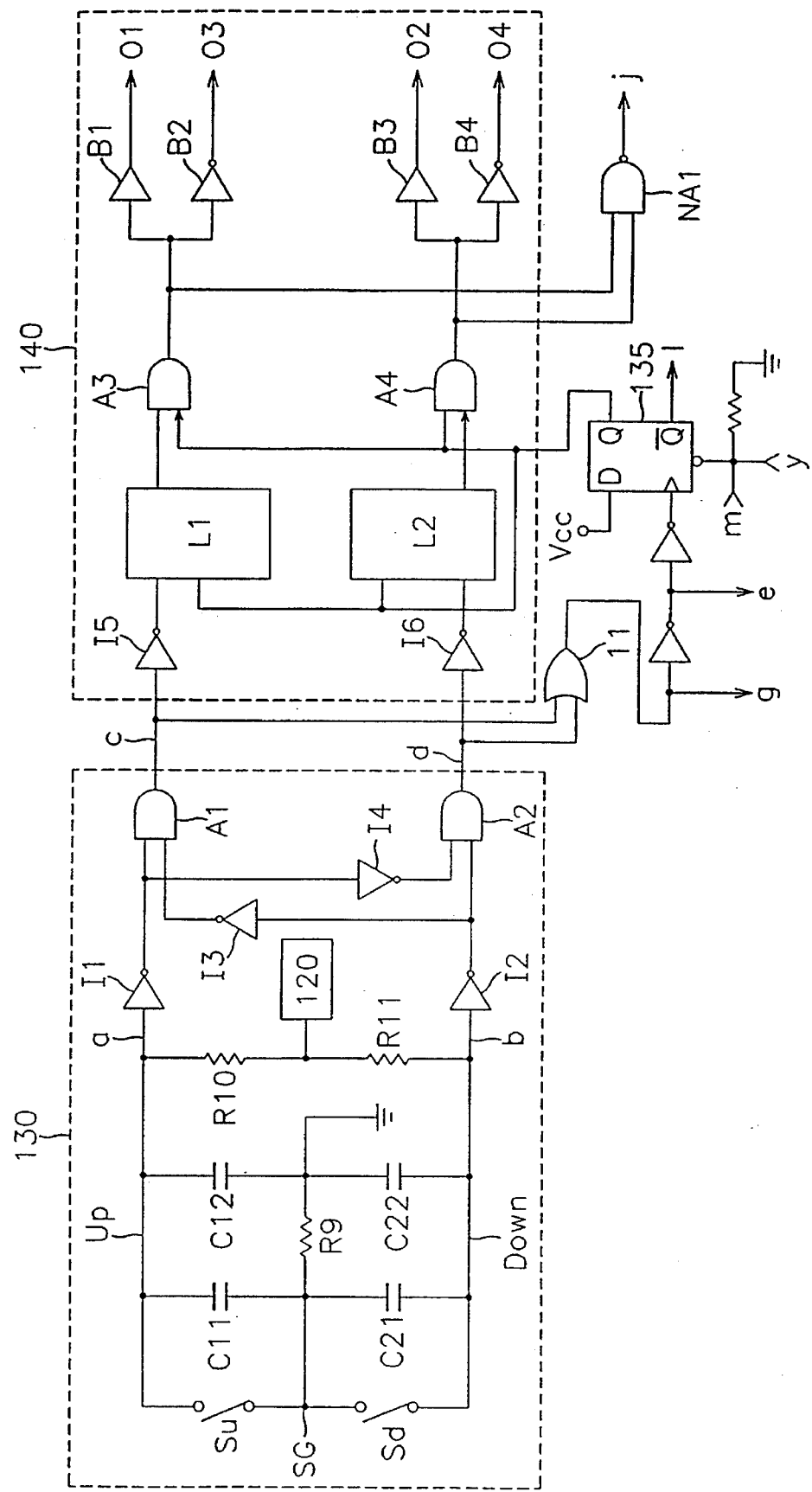
FIG. 4 is a detailed schematic of up/down signal generator 130, flip-flop 135 and motor driving switching signal generator 140 illustrated in FIG. 2.

The reference voltage generator 120 applies a voltage to an up/down command signal detector 130, which is further illustrated in FIG. 4. An output of the reference voltage generator 120 is applied to the RC circuit that is part of up/down command signal detector 130 and contains resistors R10 and R11 and capacitors C11, C12 C21 and C22. When an up switch Su or a down switch Sd is opened, the signal line SG in the RC circuit has a constant high logic level. Accordingly, inverters I1 and I2 each output low level signals, causing AND gates A1 and A2 to each receive one high level input and one low level input. Consequently, gate outputs c and d are low. In this normal state, the capacitors C11, C12, C21 and C22 are storing charge.

Closing the up switch Su creates a short circuit parallel to capacitors C11 and C12 and discharges the capacitors C11 and C12 to ground via resistor R9. Thus, the signal line becomes grounded and attains a low level. Consequently, a low level signal is input to inverter I1, and inverter I1 outputs a high level signal. Since inverter I3 is generating a high level signal at this point, AND gate A1 outputs a high level signal on output line c. Closing the down switch Sd operates the up/down command signal detector 130 in a similar fashion, creating a high level signal on output line d. Thus, input signal SG serves as a nominal ground of the control circuit 100 to stabilize the operation of the input switches Su and Sd. The inverters I3, I4 and the AND gates A1, A2 are designed to detect one signal between up/sown command signals and prevent overlap of up/down signals.

The detected up/down command signals are applied to a switching control signal generator 140 for controlling the direction of rotation of motor M within motor and switching block 200 that will cause a window to be raised or lowered according to the detected up or down command signal.

A detailed circuit diagram of switching control signal generator 140 is also shown in FIG. 4. First latch L1 and a second latch L2 are one-bit latches designed to be used if there is a need to temporarily stop the driving of the windows. For example, the latches are designed to prevent the windows from being driven by an up or down command signal when the up or down signal remains constant for a predetermined time of t2 during the window,s operation through the one-touch window positioning technique, described in more detail hereinafter.

FIG. 4 also shows a separate motor compulsory control circuit having a flip-flop 135. If any one of the outputs c or d produced from the up/down command signal detector 130 is high, the OR gate 11 outputs a high signal which is applied as a clock signal to flip-flop 135. Since the input D of the flip-flop 135 is at a high level due to Vcc, applying a clock signal causes the out, put Q to attain a high level. The latch output is controlled by the output of the flip-flop 135 which is used as a clock and which transmits a high level input to the AND gates A3, A4 of the switching control signal generator 140.

The high level input of the c line becomes low through the inverter I5 and the low level input of the d line becomes high through the inverter I6. This signal is applied to each latch L1, L2, and outputs of AND gates A3 and A4 become high and low, respectively.

The motor takes a first rotational direction and a second rotational direction, i.e. positive rotation and negative rotation for up or down movement. In order to accomplish this, it is necessary to simultaneously switch the first switching device B1 and the fourth switching device S4 as a pair and the second switching device S2 and the third switching device S3 as a pair.

The output of AND gate A3 is applied to a first buffer B1 and to a second buffer B2, and buffers B1 and B2 are connected to a first output O1 and to a third output; O3, respectively. Similarly, the output of the AND gate A4 is applied to a third buffer B3 and B4 are connected to a second output O2 and to a fourth output O4, respectively.

The output of the third AND gate A3 and the output of the fourth AND gate A4 make the first buffer B1 and the fourth buffer B4 respectively generate high level outputs. The first switching device S1 and the fourth switching device S4 as shown in FIG. 1 are both turned on to apply the battery power VDD to the motor M.

Referring now to FIG. 2, there is a one-touch circuit 170 which generates a motor driving time control signal as a function of the negative output Q of the flip-flop 135 and the detected up or down signal, and a shut-down circuit 180 which supplies the output of the one-touch circuit 170 to the clear terminal of the flip-flop 135. According to the time that the user holds the up or down switch, the user operates it for the predetermined period of time t1 or t2. If the user releases the up or down command switch before the charging capacitor C3 in FIG. 5 attains a negative voltage, this provides an indication that the user has held this command switch for a t1 period of time. If the user holds the up or down command switch so that the capacitor C3 in FIG. 5 attains a negative voltage, this provides an indication that the user has held this command switch for a t2 period of time.

Figure 5:
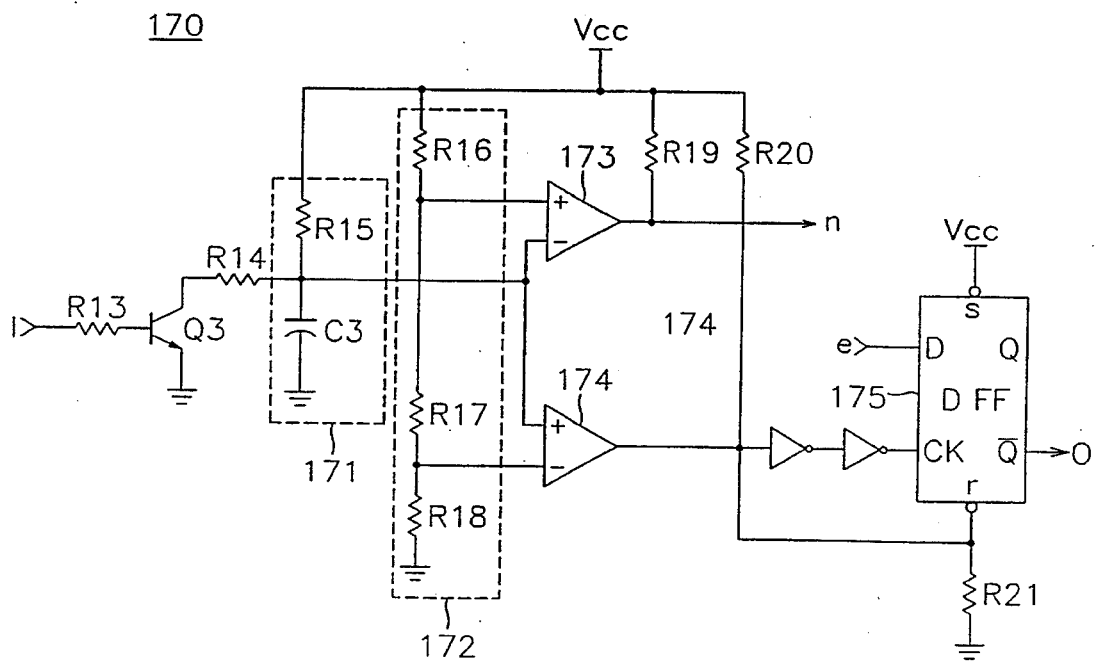
FIG. 5 is a detailed schematic of the one-touch circuit 170 illustrated in FIG. 2.

Referring to FIG. 5, the one-touch circuit 170 has a time constant circuit 171 which determines a time constant upon receipt of the negative output of the flip-flop 135. The one-touch circuit 170 also has first and second comparators 173 and 174 for comparing the time constant with a reference value and a D flip-flop 175 for receiving a reversed up or down signal as an input. The flip flop 175 uses the output of the second comparator 174 as a clock.

A high level signal at the base of switching transistor Q3 turns the switching transistor Q3 off and causes charge to be stored in capacitor C3 of the time constant circuit 171. The time constant circuit 171 starts to measure a command time when a command signal is selected from the up/down command signal detector 130. The voltage across capacitor C3 goes into the input terminals of first and second comparator 173 and 174 and compared with the reference voltage of a reference value circuit 172. Charge is still being stored in the capacitor C3 at this point. The reference value circuit 172 is a voltage divider circuit having resistors R16, R17, and R18 serially connected between power supply Vcc and ground. The voltage across resistor R18 is defined to be a minimum voltage value and is applied to the negative input terminal of the second comparator 174.

The voltage across resistors R17 and R18 combined is defined to be a maximum voltage value and is applied to the positive input terminal of the first comparator 173 for comparison with the voltage at the negative input terminal of the first comparator 173. The voltage at the negative input terminal of the first comparator 173 is also the voltage across capacitor C3.

If the comparator outputs indicate that the command time is below a predetermined period of time t2, a switching control signal of the control circuit 100 is produced from a predetermined period of time t1.

If the comparator outputs indicate that the command time is more than the predetermined minimum period of time t1, the power window is operated for a predetermined period of time t2. The D flip-flop 175 outputs a negative output signal 0 to indicate if the voltage across the capacitor C3 has risen to equal the voltage across resistor R18 of the reference value circuit 172.

An output n of the first comparator 173 indicates if the voltage across the capacitor C3 has risen to equal the voltage level at the positive input terminal of the second comparator 173. If the voltage level reaches this maximum limit, output n stops the drive mechanism of the motor M in the power circuit 200.

Thus, time t1 is defined to be a time greater than the minimum time for which the motor M of the power circuit 200 may be driven, and time t2 is defined to be the length of time that the windows of the vehicle may be opened or closed. Times t1 and t2 are externally defined and sensed by the amount of charge stored on capacitor C3.

Figure 6:
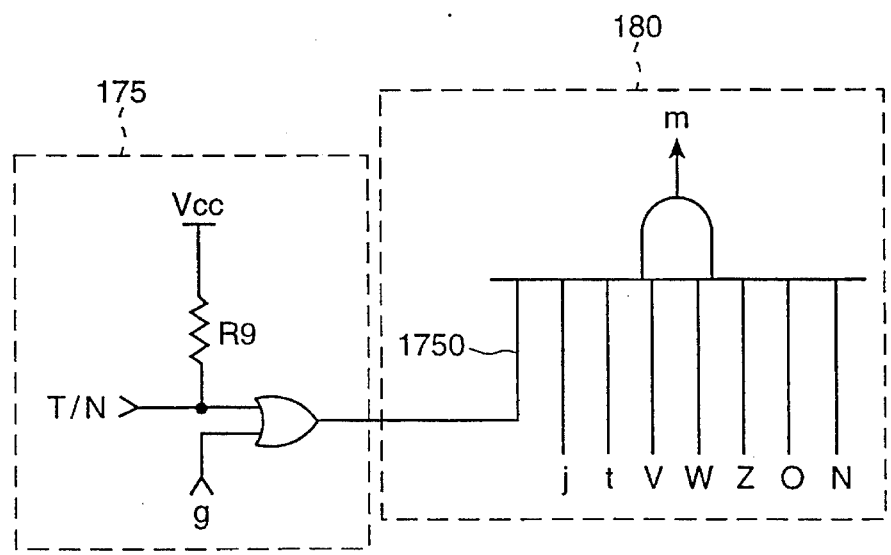
FIG. 6 is a detailed view of a shut-down circuit 180 and an old/new selection circuit 175 illustrated in FIG. 2.

Outputs n, o of the one-touch circuit 170 are inputs for the shut-down circuit 180 shown in FIG. 6. An output m of the shut-down circuit 180 is applied to a reset terminal of the flip-flop 135 shown in FIG. 4. The shut-down circuit 180 illustrated in more detail in FIG. 6 includes a multi-input AND logic gate having an output terminal. One of the inputs into the AND gate is an output 1750 of an old/new selection circuit 175, also shown in FIG. 6.

The old/new selection circuit 175 includes a two-input OR gate. One of the inputs is an output of the OR gate 11 shown in FIG. 4, and the other input is a touch/no touch (T/N) input defined by an initial external setting.

This T/N input corresponds to a bar switch mark connected to the T/N terminal shown in FIG. 1. The bar switch mark can either be grounded or be at a high-level setting.

The ground condition is operated by one-touch window positioning technique and the high level signal condition is operated by a step window positioning technique. The old/new selection circuit 175 always outputs a high level signal regardless of the state of a signal "g" in the step window positioning technique, but in the one touch window positioning technique, the output of the old/new selection circuit 175 is function of the signal "g".

The output m of the shut-down circuit 180 is applied to the reset terminal of flip-flop 135, initializing the output of the flip-flop 135 if the output m is effective.

Referring to FIG. 4, the output of AND gates A3, A4 in the switching control signal generator 140 is "0". The output of NAND gate NA1 makes the windows stop at a predetermined point if the windows are in an up (or down) mode for time t2 from the driver pressing the power window switch for time t1. A down (up) command is given midway when the T/N terminal of the old/new selection circuit 175 is high and the power window is operated by the one-touch window positioning technique.

When the T/N terminal is grounded, signal O of flip-flop 175 outputs a signal indicating that the step window positioning technique is used. When the T/N terminal is opened, signal O of flip-flop 175 outputs a signal indicating that the one-touch positioning technique is performed.

Referring to FIG. 6, the inputs of the AND gate in shut-down circuit 180 should all be at a high level in order to the output m of the shut-down circuit 180 to attain a high level. More specifically, signals t, v, w and z illustrated in FIGS. 7, 8 and 3 attain a high level. Signal z has been previously described and signals t, v and w will be described at this point.

Signal z is the output of the UVLO circuit 115 shown in FIG. 3, described above, and the circuit uses the output of the Vcc regulator 110 as an input. The output z serves as an input of the shut-down circuit 180 and releases the lock-out state in an over-reference voltage event requiring battery power Vdd.

The output attains a locked state in case a below reference voltage event occurs. This locked state stops the operation of the blocks inside the entire control circuit 100 except for the Vcc regulator 110, the UVLO 115, the reference voltage generating circuit 120 and the power-off continue circuit 185. The UVLO circuit 115 has a positive input terminal having a reference voltage by the resistors R1 and R2.

The windows are operated by proper up and down signals and more minute operation of the window is performed by the one-touch circuit.

The following description relates to the overheat and overload protecting circuits of the control circuit 100.

Figure 7:
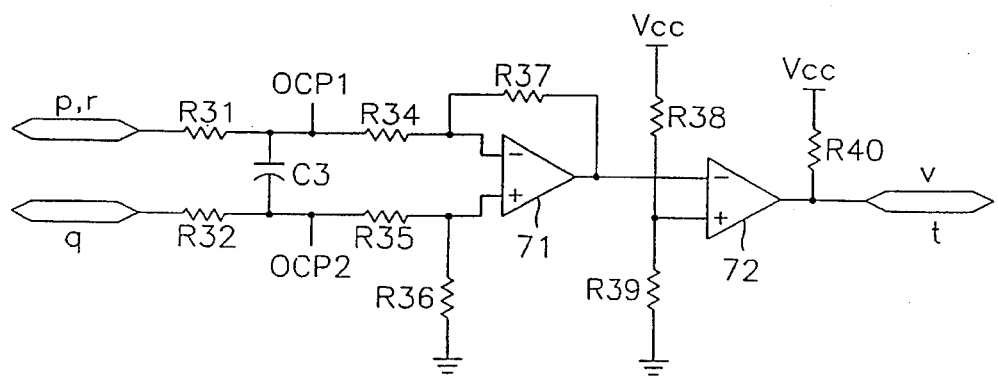
FIG. 7 is a detailed view of an overcurrent protection circuit 155 illustrated in FIG. 2.

FIG. 7 is a circuit diagram of blocks 155 and 160 shown in FIG. 2. The blocks 155 and 160 are operated by receiving over current sensing signals of the power circuit 200 at terminals OCP1 and OCP2 of the control circuit 100, shown in FIG. 1. Although structurally identical, block 155 inputs a p signal whereas block 160 inputs the r signal, which therefore causes, respectively, the generation of the different v and t signals output from the FIG. 7 circuit diagram.

If an up command is the input from the up/down signal of the control circuit 100, the first to fourth switches S1 through S4 of the power circuit 200 communicate to drive the motor M. If motor M overloads due to an abnormal operating condition, such as an object getting caught between the window and the sash of the vehicle, the signal r detected from the current flowing in the switching device 84 by overcurrent sensing resistor R7 goes to the negative input terminal of comparator 71 via resistors R31 and R34. If a down command is the input, signal p detected from the resistor R6 of the second switching device S2 is applied to the over current protecting circuit.

A differential signal among the sensing signals p, r and OCP1 is applied to the negative input terminal of comparator 72 via differential amplifier 71. Resistors R31 and R32 and capacitor C3 serve as means for filtering the sensing signals p and r.

The comparator 72 compares the reference voltage divided by resistors R38 and R39 with the input signal to produce a signal V or t. This signal V or t is an input for the shut-down circuit 180 in FIG. 6 to stop the motor and consequently stop the power window.

If the power circuit 200 used a conventional mechanical switch, the battery voltage would become disconnected directly when the motor overloads, thus requiring a switch for cutting off the over current. Such a switch is expensive. In contrast, the present invention does not require a conventional switch, resulting in cost savings, due to the existence of the overcurrent protection circuit and the overheat protection circuit.

Figure 8:
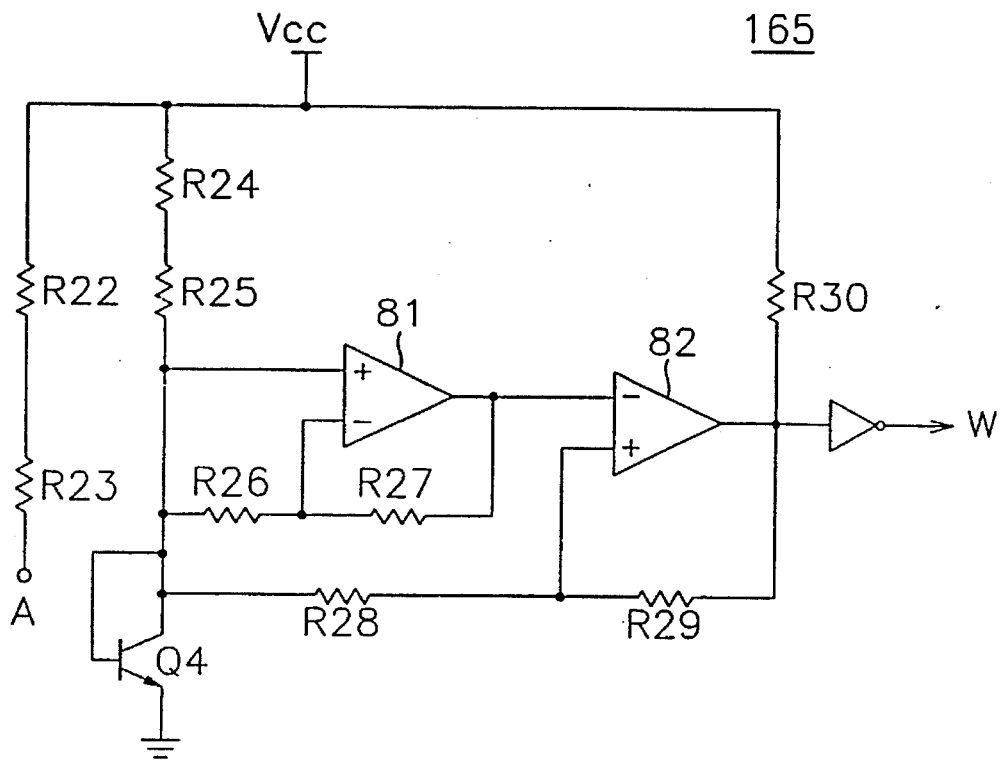
FIG. 8 is a detailed view of an overheating protection circuit 165 illustrated in FIG. 2.

FIG. 8 depicts the overheat prevention circuit 165. The output of overheat protection circuit 165 is applied to the shut-down circuit 180. The circuit 165 has an amplifying means 81 and a comparator 82. The comparator 82 senses any indication of an overheat state from the amplified signal.

If an overheat state occurs, window operation is compulsorily stopped by the shut-down circuit 180. Transistor Q1-1 of FIG. 1 serves as a temperature sensing device. Small variations of internal voltage Vbe (voltage by minute resistance) are amplified by the amplifier 81. The temperature sensing device Q1-1 disposed around the motor M thus detects heat. The device Q1-1 may be disposed on a heat-radiating board of the switching device or may be connected to the overheat prevention circuit 165 of the control circuit 100 via a signal line.

If the start key is turned off and the vehicle stops, the supply of the voltage to the electronic circuit is disconnected to maintain control over the battery powered device. However, if the windows are open when the start key is turned off, the control circuit remains operative for a predetermined period of time so that the driver does not have to restart the vehicle in order to operate the windows.

Figure 9:
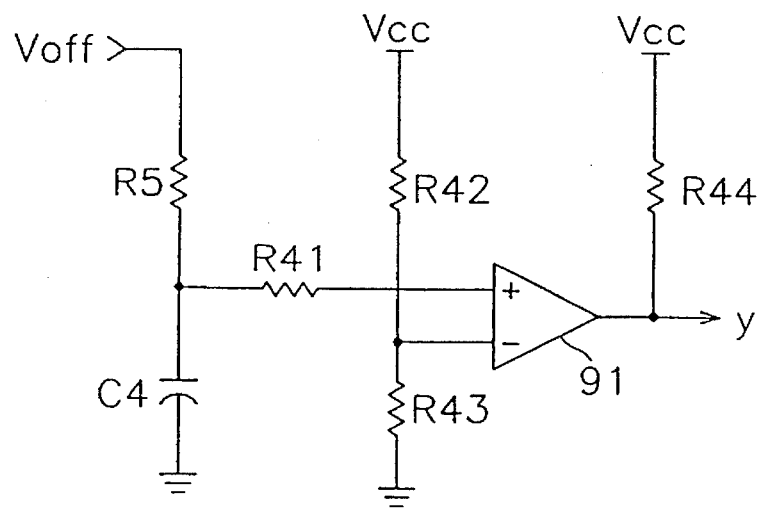
FIG. 9 is a detailed view of a power-off continue circuit 185 illustrated in FIG. 2.

In order to accomplish this, the power-off continue circuit 185 shown in FIG. 9 is formed in the control circuit 100. The Voff senses if the start key is turned off and uses this input to produce the signal y as output. The signal y is then applied as an input of OR gate in the old/new selection circuit 175, shown in FIG. 6, and an output of the control circuit 100 is produced for a predetermined period of time t3.

Figure 10:
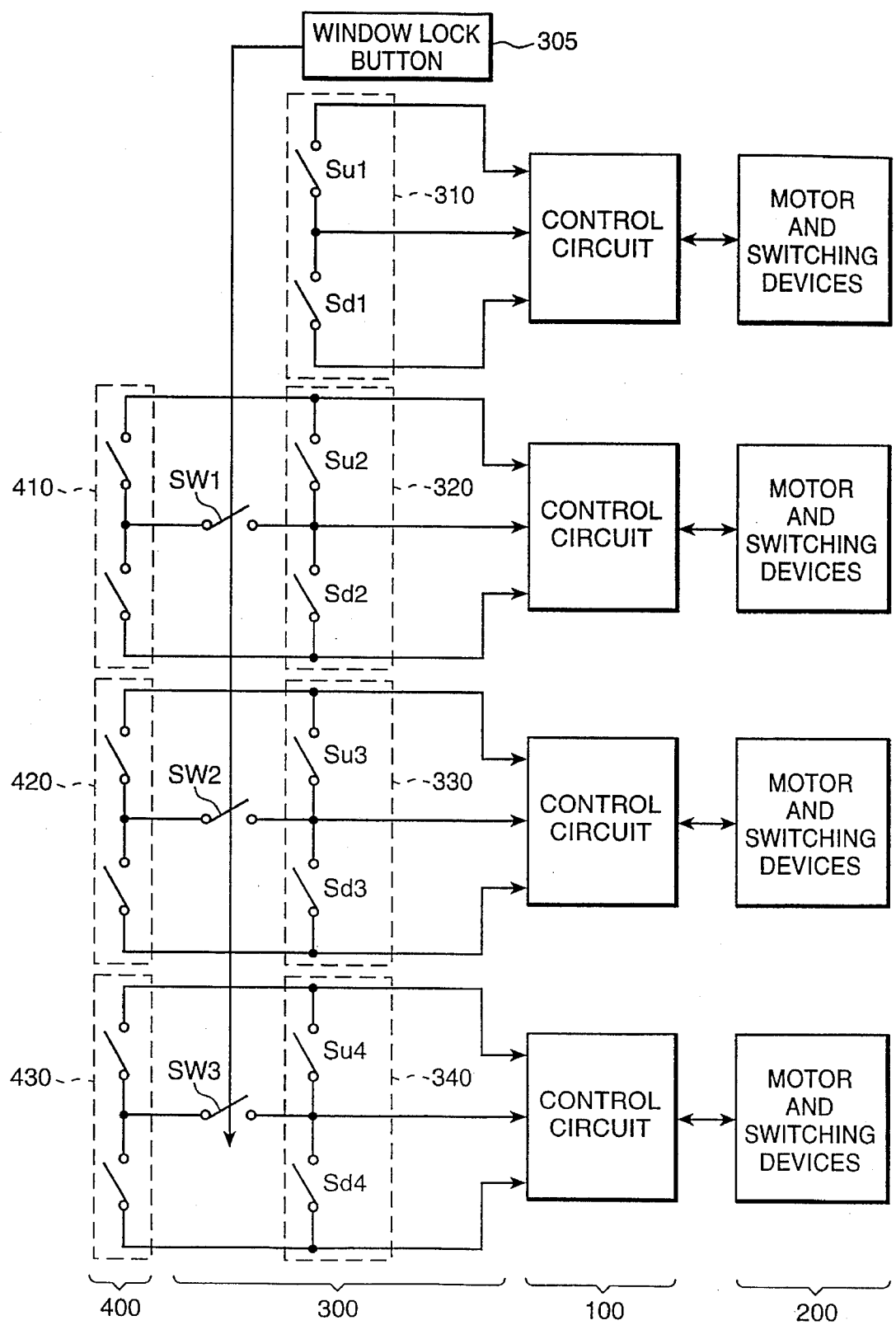
FIG. 10 is an overall illustration of a power window system including four power window control circuits according to the present invention.

The predetermined period of time t3 is determined as a function of the value of capacitor C4, and the signal y attains a low level from comparator 91 after time t3 to disconnect the window operation. The signal y becomes high to make the control circuit 100 operative. The circuit is installed in the control circuit 100 but the resistor R5 and capacitor C4 are connected outside of the chip, as shown in FIG. 1, and the key-off sensing signal Voff is applied to resistor R5. If the user hold the up or down position switch for a period of time t3, the window is thus driven, The control circuit 100, up/down command applying switches S1 through S4 and the power circuit 200 are enough to operate a window. The vehicle has four windows and the above device is installed on each window. FIG. 10 depicts such a structure.

A window controller 300 includes a window lock button 305, four pairs of switches 310, 320, 330 and 340 and three ground switches 8W1, SW2 and SW3. Switch pair 310 includes switches Su1 and Sd1 which command the operation of the front left window of the vehicle. The remaining three switch pairs 320, 330 and 340 have two switches Su2 and Sd2, Su3 and Sd3, and Su4 and Sd4, respectively, and command the operation of the front right window, the rear left window, and the rear right window. These four pairs of switches are mounted on the driver's side of the vehicle.

Switches SW1, SW2 and SW3 connect and disconnect a separate power window controller 400 from the control circuit 100 using the window lock button 305 at a time which is easily controlled in the control power window controller 300.

The separate power window controller 400 has three pairs of switches 410, 420, and 430. Each pair 410, 420, and 430 comprises two up/down switches which give up/down commands. The three switch pairs 410, 420, and 430 are installed on the front right, rear left, and rear right doors and can operate the window corresponding to each door. This mechanism enables passengers to move the window closest to them with a simple manual operation.

Two switch control points of three pairs of the switches are connected to one side of each switch SW1, SW2, and SW3 and are controlled by the window lock button 305 of the central power window controller 300 mounted on the driver's side.

By controlling the power window system with a signal level instead of directly controlling the power line as in the conventional system, an inexpensive small switch replaces the costly mechanical switch in conventional systems, simplifying wiring and reducing the weight of the system. In addition, the switch is turned on or turned off as a signal level, eliminating arcing and extending the switch's life indefinitely.

While this invention has been described in connection with what is presently considered to be the most practical and preferred embodiments, it is to be understood that the invention is not limited to the disclosed embodiments and is intended to cover various modifications and equivalent arrangement included within the spirit and scope of the appended claims.

What is claimed is:

1. An apparatus for controlling the supply of power from a battery to a window driving motor in response to actuation of a control switch having window up and window down switch positions to initiate raising and lowering of power windows in a vehicle comprising:

a constant voltage generator for generating a substantially constant DC voltage from said battery;

a desired window position signal detector which detects window up and window down switch signals resulting from said switch positions of said control switch and which outputs only one of said window up and window down switch signals at a time;

a switching control signal generator for controlling said window driving motor according to said one window up and window down switch signal detected by said signal detector, said switching control signal generator including a flip-flop which uses said one window up and window down switch signal as a clock input and outputs a positive output signal indicating said one window up and window down switch signal is different from a previous one window up and window down switch signal;

a one-touch control circuit which inputs said one window up and window down switch signal, said one touch circuit generating a first one touch signal to cause said switching control signal generator to control said window driving motor so that said window fully raises or lowers when said one-touch circuit detects that said one window up and window down switch signal continuously occurs for greater than a predetermined timer and a shut-down circuit which inputs said first one-touch signal from said one-touch control circuit to initiate one-touch operation.

2. An apparatus according to claim 1, wherein said desired window position signal detector include:

means for detecting said window up switch signal and said window down switch signal;

a first AND gate inputting said window up switch signal and a delayed window down switch signal; and a second AND gate inputting said window down switch signal and a delayed window up switch signal, said first and second AND gates cooperatively operating so that only one of said first and second AND gates output said one window up and window down switch signal at a time.

3. An apparatus according to claim 1, wherein said switching control signal generator includes:

a first latch which latches said one window up switch signal;

a second latch which latches said one window down switch signal;

first and second buffers for producing first rotational direction driving signals from said first latch output for controlling driving said motor in a first rotational direction; and third and fourth buffers for producing second rotational direction driving signals from said second latch output for controlling driving said motor in a second rotational direction.

4. An apparatus according to claim 3 further including third and fourth AND gates each having a first input connected to said output of said first and second latches, respectively and an output connected to said first and second buffers and said third and fourth buffers, respectively, and each of said third and fourth AND gates have a second input which receives said positive output signal from said flip flop and further including a first NAND gate which inputs said third and fourth AND gate outputs and generates an error signal which is supplied to said shut-down circuit if both said third and fourth AND gates output signals at the same time.

5. An apparatus according to claim 1, wherein said one-touch circuit includes:

a time constant circuit determining a time constant upon receipt of a negative output signal of said flip-flop;

first and second comparators comparing said time constant with a reference time constant to determine whether said one window up and window down switch signal continuously occurs for greater than said predetermined time, said first comparator outputting said first one-touch signal to said shut-down circuit and said second comparator outputting a second one-touch signal a clock input of an old/new state flip flop.

6. An apparatus according to claim 1, further including:

an over current protection circuit which detects over current flowing to said motor and generates an overcurrent signal which is supplied to said shut-down circuits; and an overheating protection circuit for preventing overheating of said motor by generating an overheat signal which is supplied to said shut-down circuit when said motor reaches a predetermined temperature.

7. An apparatus according to claim 1, further including a power-off continue circuit for generating said clear signal when said vehicle is turned off so that operation of said switching control signal generator can continue operating using said one window up and window down switch signal.

8. An apparatus according to claim 1 wherein an input of the shut-down circuit is a touch/no input signal.

9. An apparatus for controlling windows in a vehicle having a battery comprising:

a motor for driving a vehicle window:

first, second, third, and fourth switching means for controlling power flow from said battery to said motor;

a window control system for controlling said first and fourth switching means to cause said motor to rotate in a first rotational direction, and for controlling said second and third switching means to cause said motor to rotate in a second rotational direction, said window control system including:

a constant voltage generator for generating a substantially constant DC voltage from said battery;

a desired window position signal detector which detects window up and window down switch signals resulting from said switch positions of said control switch and which outputs only one of said window up and window down switch signals at a time;

a switching control signal generator for establishing first, second, third and fourth switching signals for controlling said switching means according to said one window up and window down switch signal detected by said signal detector, said switching control signal generator including a flip-flop which fuses said one window up and window down switch signal as a clock input and outputs a positive output signal indicating said one window up and window down switch signal is different from a previous one window up and window down switch signal;

a one-touch control circuit which inputs said one window up and window down switch signal, said one touch circuit generating a first one touch signal to cause said switching control signal generator to control said window driving motor so that said window fully raises or flowers when said one-touch circuit detects that said one window up and window down switch signal continuously occurs for greater than a predetermined time; and a shut-down circuit which inputs said first one-touch signal from said one-touch control circuit to initiate one-touch operation.

10. An apparatus according to claim 9, wherein said first, second, third and fourth switching means are metal oxide semiconductor transistors.

11. An apparatus according to claim 9, wherein said desired window position signal detector include:

means for detecting said window up switch signal and said window down switch signal;

a first AND gate inputting said window up switch signal and a delayed window down switch signal; and a second AND gate inputting said window down switch signal and a delayed window up switch signal, said first and second AND gates cooperatively operating so that only one of said first and second AND gates output said one window up and window down switch signal at a time.

12. An apparatus according to claim 9, wherein said switching control signal generator includes:

a first latch which latches said one window up switch signal;

a second latch which latches said one window down switch signal;

first and second buffers for producing said first and fourth switching signals for controlling driving said motor in said first rotational direction; and third and fourth buffers for producing said second and third switching signals for controlling driving said motor in said second rotational direction.

13. An apparatus according to claim 9 further including third and fourth AND gates each having a first input connected to said output of said first and second latches, respectively and an output connected to said first and second buffers and said third and fourth buffers, respectively, and each of said third and fourth AND gates have a second input which receives said positive output signal from said flip-flop and further including a first NAND gate which inputs said third and fourth AND gate outputs and generates an error signal which is supplied to said shut-down circuit if both said third and fourth AND gates output signals at the same time.

14. An apparatus according to claim 9, wherein said one-touch circuit includes:

a time constant circuit determining a time constant upon receipt of a negative output signal of said flip-flop;

first and second comparators comparing said time constant with a reference time constant to determine whether said one window up and window down switch signal continuously occurs for greater than said predetermined time, said first comparator outputting said first one-touch signal to said shut-down circuit and said second comparator outputting a second one-touch signal a clock input of an old/new state flip-flop.

15. An apparatus for controlling the supply of power from a battery to a window driving motor in response to actuation of a control switch having window up and window down switch positions to initiate raising and lowering of power windows in a vehicle comprising:

a constant voltage generator for generating a substantially constant DC voltage from said battery;

a desired window position signal detector which detects window up and window down switch signals resulting from said switch positions of said control switch and which outputs only one of said window up and window down switch signals at a time;

a switching control signal generator for controlling said window driving motor according to said one window up and window down switch signal detected by said signal detector, said switching control signal generator including a flip-flop which uses said one window up and window down switch signal as a clock input and outputs a positive output signal indicating said one window up and window down switch signal is different from a previous one window up and window down switch signal;

a one-touch control circuit which inputs said one window up and window down switch signal, said one touch circuit generating a first one touch signal to cause said switching control signal generator to control said window driving motor so that said window fully raises or lowers when said one-touch circuit is enabled;

an overcurrent protection circuit which detects over current flowing to said motor and generates an overcurrent signal;

an overheating protection circuit for preventing overheating of said motor by generating an overheat signal when said motor reaches a predetermined temperature; and a shut-down circuit which inputs said first one-touch signal from said one-touch control circuit to initiate one-touch operation and inputs said overcurrent and overheating signals to initiate shutdown operation.

* * * * *